(12) United States Patent
Cooper

(10) Patent No.: US 9,275,504 B1
(45) Date of Patent: Mar. 1, 2016

(54) SENSOR AND FEEDBACK ASSEMBLY FOR A BICYCLE

(71) Applicant: Ken Bradford Cooper, Littleton, CO (US)

(72) Inventor: Ken Bradford Cooper, Littleton, CO (US)

( * ) Notice: Subject to any disclaimer, the term of this patent is extended or adjusted under 35 U.S.C. 154(b) by 0 days.

(21) Appl. No.: 14/513,469

(22) Filed: Oct. 14, 2014

Related U.S. Application Data

(60) Provisional application No. 61/963,039, filed on Nov. 21, 2013, provisional application No. 62/030,689, filed on Jul. 30, 2014.

(51) Int. Cl.
*G06F 19/00* (2011.01)
*G07C 5/08* (2006.01)
*B62J 99/00* (2009.01)

(52) U.S. Cl.
CPC ......... *G07C 5/0816* (2013.01); *B62J 2099/002* (2013.01); *B62J 2099/0033* (2013.01)

(58) Field of Classification Search
CPC .............. G07C 5/0816; B62J 2099/002; B62J 2099/0033
USPC .............................. 701/1, 22, 33.3; 702/3, 45
See application file for complete search history.

(56) References Cited

U.S. PATENT DOCUMENTS

| | | | | |
|---|---|---|---|---|
| 6,095,539 | A * | 8/2000 | Graham | 280/231 |
| 6,098,493 | A * | 8/2000 | Cortes | 74/551.8 |
| 7,006,901 | B2 * | 2/2006 | Wang | 701/1 |
| 8,612,165 | B2 * | 12/2013 | Froncioni et al. | 702/45 |
| 2008/0202281 | A1 * | 8/2008 | Bruyere | 74/551.8 |
| 2011/0261453 | A1 * | 10/2011 | Felt | 359/481 |
| 2012/0221257 | A1 * | 8/2012 | Froncioni et al. | 702/45 |
| 2012/0272777 | A1 * | 11/2012 | Tolhurst | 74/491 |
| 2013/0054143 | A1 * | 2/2013 | DeGolier | 702/3 |
| 2013/0059698 | A1 * | 3/2013 | Barton | 482/63 |
| 2015/0019062 | A1 * | 1/2015 | Previdi et al. | 701/22 |

OTHER PUBLICATIONS

Zhang et al., Rider/Bicycle Pose Estimation with IMU/Seat Force Measurements, 2012, IEEE, p. 604-609.*

* cited by examiner

*Primary Examiner* — McDieunel Marc
(74) *Attorney, Agent, or Firm* — Martin G. Ozinga; Phillips Murrah PC

(57) ABSTRACT

A feedback system and indicator for aerodynamic positioning while bicycling comprising one or more sensors located on the bicycle in positions that indicate when rider is in an aerodynamic position that activates and or otherwise records data associated with aerodynamic positioning while riding.

3 Claims, 6 Drawing Sheets

SENSOR AND FEEDBACK ASSEMBLY FOR A BICYCLE

CROSS-REFERENCE TO RELATED APPLICATIONS

Priority is claimed from provisional application U.S. Ser. No. 61/963,039 filed on Nov. 21, 2013 and provisional application U.S. Ser. No. 62/030,689 filed on Jul. 30, 2014 and incorporated by reference herein.

BACKGROUND OF THE INVENTION

1. Field of the Invention

In general, the present invention relates to a feedback system for a bicyclist. More particularly, the present invention provides an indicator for time spent in an aerodynamic position while bicycling by utilizing a sensor that is activated when the cyclist is in an aerodynamic position.

2. Description of the Prior Art

As in most sports racing, reduced air resistance is preferable and especially so in bicycle sports. Much time and energy has been spent attempting to reduce air resistance with aerodynamic helmets, clothing, bicycle designs and so forth. One of the most immediate ways to reduce air resistance while bicycling is for the rider to stay in a low profile, which is obviously more aerodynamic than sitting upright. As noted by bicycle enthusiast magazine, BICYCLING MAGAZINE, November 2013, " . . . the biggest, most basic improvement any rider can make is still to ride with your hands in the drops (aerodynamic position) more often."

An aerobar is an elongated bar that is typically attached to a bicycle handlebar, or alternatively, formed as a part of the handlebar itself. Although handlebars typically extend in a direction generally perpendicular to the path of travel, an aerobar is designed to extend generally along the direction of travel. When formed to be discrete from the handlebar, aerobars are formed in pairs. When positioned on the bicycle, the cyclist will use the aerobars to help support cyclist's weight while assuming a more aerodynamic profile.

The cyclist will typically bend over in an aerodynamic tuck position wherein the proximal portions of the cyclist's forearms (near cyclist's elbows), rest on pads attached to the handlebars with cyclist's hands and forearms extending forward of cyclist's chest, the cyclist's hands gripping the aerobar near its distal end to better pierce the air. The proximal end of the aerobar is positioned closest (rearward-most) to the bicycle frame while the distal end is farthest away (forward-most).

While the value of aerodynamics is generally understood, it is not applied consistently among riders and is not currently a data point available for analysis by the general public. Furthermore, it is desirable to provide a training system to build the habit, enhance the feedback and allow the individual to recognize the value of maintaining the aerodynamic position and its impact on speed, heart rate, and so forth.

Therefore, it is preferable to be as aerodynamic as possible for as long as possible in a race and while training in general. It is also therefore desirable to provide feedback to a bicyclist of the benefits of being aerodynamically positioned as well as an incentive or reminder to stay in an aerodynamic position as much as possible. The current invention provides an inexpensive, effective, and more reliable apparatus and method of indicating when a cyclist is in the aerodynamic position and promoting staying in the aerodynamic position where the prior art fails.

SUMMARY OF THE INVENTION

In view of the foregoing disadvantages inherent in the known types of feedback systems related to bicycling now present in the prior art, the present invention provides a new and improved feedback system for indicating when a rider is and stays in an aerodynamic position. As such, the general purpose of the present invention, which will be described subsequently in greater detail, is to provide a new and improved aerodynamic position indicator and feedback system for use with bicycles which may be fitted to existing bicycles which has all the advantages of the prior art devices and none of the disadvantages.

To attain this, the present invention essentially comprises a feedback system and indicator for aerodynamic positioning while bicycling comprising one or more sensors located on the bicycle in positions that indicate when rider is in an aerodynamic position that activates and or otherwise records data associated with aerodynamic positioning while riding. The sensor may generally be placed such that the rider's position is indicated, recorded and otherwise utilized.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved feedback system and indicator for aerodynamic positioning while bicycling that may be easily attached, implemented and utilized.

It is a further object of the present invention to provide a new and improved feedback system and indicator for aerodynamic positioning while bicycling, which is of a durable and reliable construction and may be utilized on multiple styles of bicycles.

An even further object of the present invention is to provide a new and improved feedback system and indicator for aerodynamic positioning while bicycling, which is susceptible to a low cost of manufacture with regard to both materials and labor, and which accordingly is then susceptible to low prices of sale to the consuming public, thereby making such economically available to cycling enthusiast.

Still another object of the present invention is to provide a new and improved feedback system and indicator for aerodynamic positioning while bicycling, which provides all of the advantages of the prior art, while simultaneously overcoming some of the disadvantages normally associated therewith.

Another object of the present invention is to provide a new and improved feedback system and indicator for aerodynamic positioning while bicycling with relatively no or minimal moving parts, consistent performance in all environments, and provides relatively easy retrieval of information and feedback in general.

An even further object of the present invention is to provide a new and improved feedback system and indicator for aerodynamic positioning while bicycling, which may provide visual indicators, warnings, and so forth of when a rider is in a preferred aerodynamic position or not.

Still another object of the present invention is to provide a new and improved feedback system and indicator for aerodynamic positioning while bicycling, which may be adapted to use with current feedback systems known in bicycling.

Yet another object of the present invention is to provide a new and improved feedback system and indicator for aerodynamic positioning while bicycling that may be utilized with existing smart phones and other consumer electronics.

And another object of the present invention is to provide a new and improved feedback system and indicator for aerodynamic positioning while bicycling that provides a new way to review and or analyze aerodynamic position and resultant outcomes during training and racing.

It is a further object of the present invention to provide a new and improved feedback system and indicator for aerodynamic positioning while bicycling that may act as guidance for training, racing, bike fitting and clinical applications such as but not limited to physical therapists who specialize in treating bicyclists to help determine whether there are any anomalies from right to left side.

It is a further object of the present invention to provide a new and improved feedback system and indicator for aerodynamic positioning while bicycling that can analyze a user's power, cadence, heart rate, and or speed while in an aerodynamic position and when not in an aerodynamic position. It may also provide information on what incline they "bail" out of the aero position and sit up. It is common that when a rider faces an incline they get out of the aerodynamic position and into more of sitting up and or standing position. It is therefore desirable to know at what gradient, such as 1%, 2%, 3%, and so forth they leave the aero position and sit up. This may aid in finding an optimal amount of time to stay in the aero position to minimize injury as well as see the difference in their speed in aero vs. non-aero.

These, together with other objects of the invention, along with the various features of novelty, which characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the drawings in wherein.

DETAILED DESCRIPTION OF THE PREFERRED EMBODIMENTS

Figure 1:
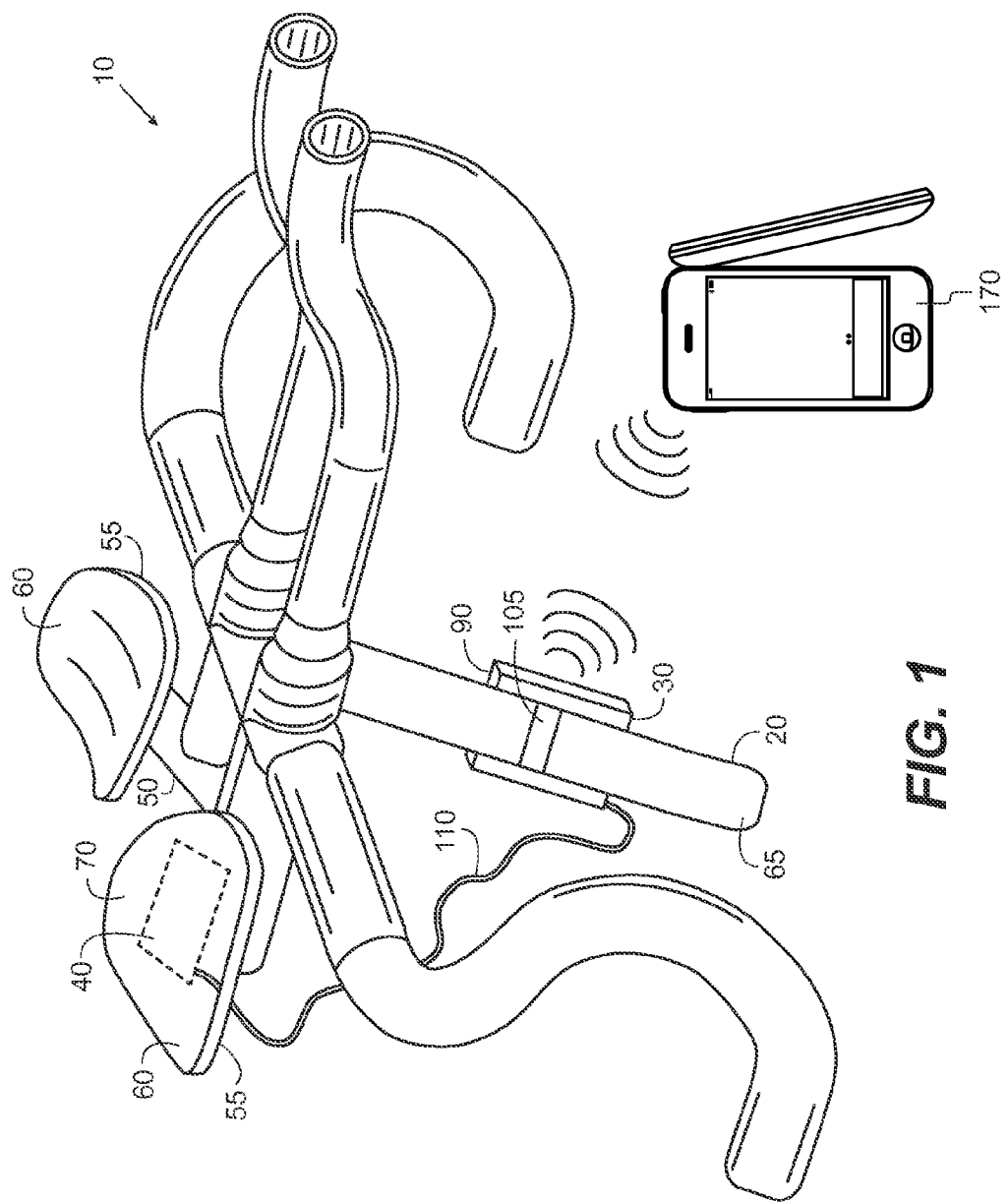
FIG. 1 is a general illustration of the preferred embodiment of the invention associated with an aerobar for a bicycle and a smartphone link.

Referring now to the drawings, wherein like reference numerals designate corresponding structure throughout the views, and referring in particular to FIGS. 1 and 2, reference numeral 10 generally refers to a new and improved aerodynamic position feedback device, sensor, indictor and combinations thereof assembly, hereinafter referred to collectively as invention 10. Invention 10 as generally depicted is for use with bicycle 20 although it is understood that invention 10 may be used on all types of vehicles wherein the user and or operator body positioning for maximizing aerodynamic positioning may be desired. The embodiments described herein should not be considered limiting to just bicycles or vehicles. It is also understood the current invention may be an apparatus, device, system, method of use and combinations thereof.

Invention 10 may comprise a sensor system 30 attached to bicycle 20 that generally indicates when user or rider 15 is in a preferred or desired aerodynamic position 25, which occurs when rider 15 has placed their hands 45, arms, forearms 35, and so forth on sensor 40 of sensor system 30. Sensor system 30 may have other components as described further below.

It is understood that invention 10 may be utilized with other equipment and devices other than bicycles. It is contemplated that other exercise equipment may be but is not limited to stationary bicycles, stair stepper machine, treadmills and so forth. It is contemplated that sensor system 30 may be utilized to indicate if the user of the equipment is in the desired position 25 for the use of the equipment and or diagnose incorrect positioning. By example, a stair stepper machine user should have hands and or body positioned on the equipment in a desired fashion. Sensor system 30 may provide an indicator when the user is in a non-desirable and or non-optimal position, provide weight-bearing comparisons from side to side, indicate when weight bearing exceeds a specific percentage of bodyweight and so forth.

Sensor System

Sensor 40 may be a dome cap sensor that may utilize elastomeric injection molded dome-caps such as are used in the prior art as simple momentary-on electrical switch. The injection-molded dome-cap may be a component of a sensor having a single threshold serving as a simple make or break, closed or open, on or off, electrical switch in a circuit. Sensor 40 is essentially activated by touch and or pressure exerted from rider 15 when in contact with sensor 40 as known in the art.

It is understood that numerous known sensors may be utilized and the current invention is not to be considered limited to a dome cap sensor and one or more sensors 40 may be utilized as well as combinations of different kinds of sensor(s) 40. Sensor 40 may also be a pressure sensor, magnet separation type sensor similar to SRM magnet type, an optical eye sensor, combinations thereof, and so forth. It is also contemplated to provide wireless technology such as "arm band" option. This may be worn on forearm 35 and send a wireless signal when rider 15 is in the correct and or desired position 25 as discussed in greater detail below.

Figure 2:
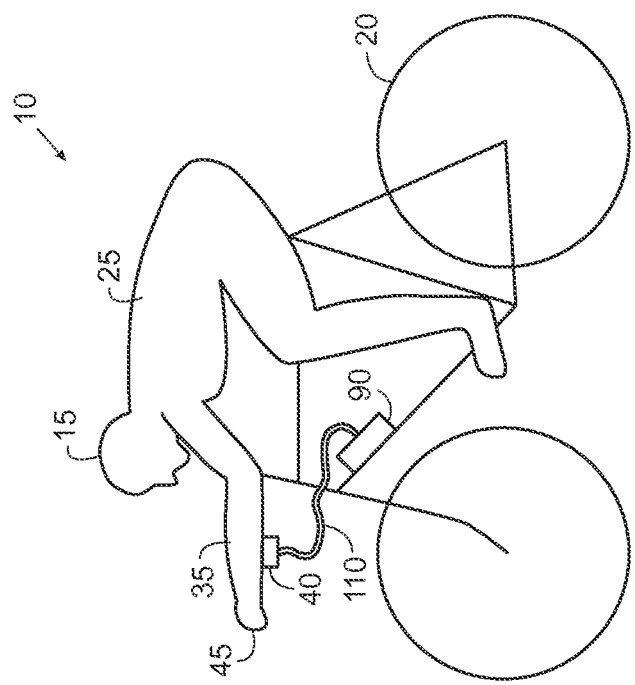
FIG. 2 is a general illustration of the preferred embodiment of the invention depicting a user in the aero position utilizing an aerobar for a bicycle.

Now referring to FIG. 1 and the illustrations in general, sensor 40 may be located on an aerobar 50 pad 60 surface 70 where rider's 15 elbows, forearms 35 and so forth would be placed when rider 15 is in aerodynamic and or preferred body position 25. It is understood that sensor 40 may be located on other parts of aerobar 50, such as where rider's 15 hands 45 would be located. It is also understood that sensor 40 may be an aftermarket attachment place, stuck, glued and so forth on pad 60 surface 70 as desired and or removably attached in general. Sensor 40 may be integrated during manufacture into pad 60 such that sensor 40 is generally integrated into surface 70.

It is also understood that aerobars frequently have a two piece construction with a support structure 55 made from metal or other durable and hard material with removable pad 60. It is contemplated that sensor 40 may be placed between support structure 55 and pad 60.

It is also contemplated to utilize a magnet and or optic eye option, which may include two sensors(s) 40 on either side of pad 60 such that the arm, hand 45, forearm 35 and so forth would "block" the magnet or optical eye when rider 15 was in desired position 25. It is also understood that sensor(s) 40 may be utilized in combination on the hand held area, forearm area and so forth.

Furthermore, it is contemplated sensor 40 may be located on pad 60 and or surface 70. It is understood that rider 15 may move their hand 45, arm, forearm 35 while generally still in the aerodynamic position 25 to reach for water, nutrition and so forth, which could send a false indicator of leaving the aerodynamic position 25. Therefore, sensor 40 may be generally located on the non-dominant hand side since dominant hand is usually used for water bottle, nutrition, etc. Furthermore, bilateral sensors(s) 40 may be utilized to diagnose side-to-side differential, pressure, injury prevention and so forth.

Figure 3:
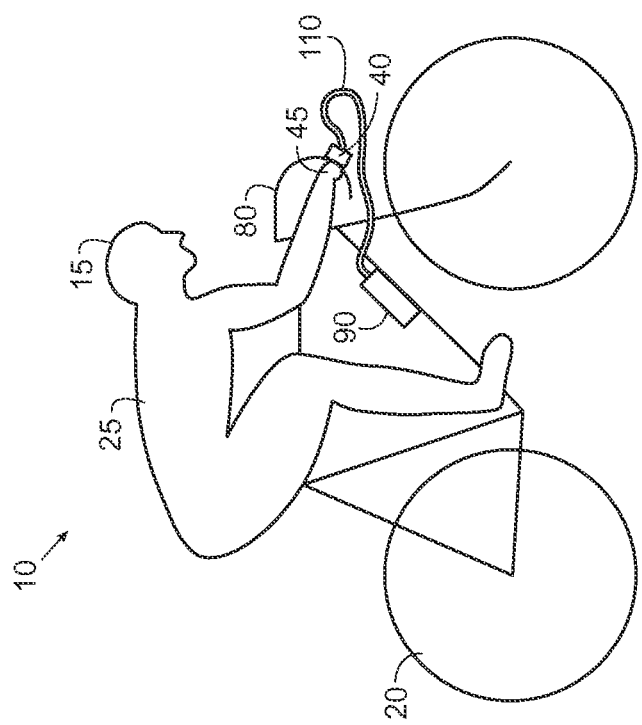
FIG. 3 is a general illustration of the preferred embodiment of the invention depicting a user in the aero position utilizing an aerobar for a bicycle having drop down handles.

Now referring to FIG. 3 and the illustrations in general, it is also understood that aerobars vary greatly in terms of design, so that specific positioning may vary accordingly. It is contemplated invention 10 may be utilized on any bicycle 20 where aerodynamic position 25 may be obtained by rider 15 and sensed by the location of hand 45, arm, forearm 35, and so forth. This may include all bicycles and may include bicycles with aerobars, bicycles without aerobars, standard road bike handlebars, and so forth. Invention 10 may be utilized with "clip-on" aerobars 50, which are generally clipped onto standard road bike handlebars, the positioning may be as describe above.

It is contemplated that other types of bicycles and bicycle handles may utilize invention 10 where sensor 40 may be located on the "drops" of handlebars 80 and may be similar to the above description, depending on the specific design and positioning of both the clip-ons and the road bike handlebars. By example, standard road bikes without aerobars still often include a "drop" handle position allowing the rider to assume a more aerodynamic position by generally lowering the body and or extending down.

Sensor system 30 may have unit 90 that may be positioned out of the way of rider 15 on the bars, underneath surface of the pad 60 and or support structure 55 or a bar 65 itself. Unit 90 may be inserted inside the drop where frequently a removable cap is located on the end that could be removed and sensor system 30, sensor 40, unit 90 and combinations thereof can be inserted inside. Otherwise, the unit 90 would be placed elsewhere on the bike 20 based on the needs and current equipment of the rider 15.

Figure 4:
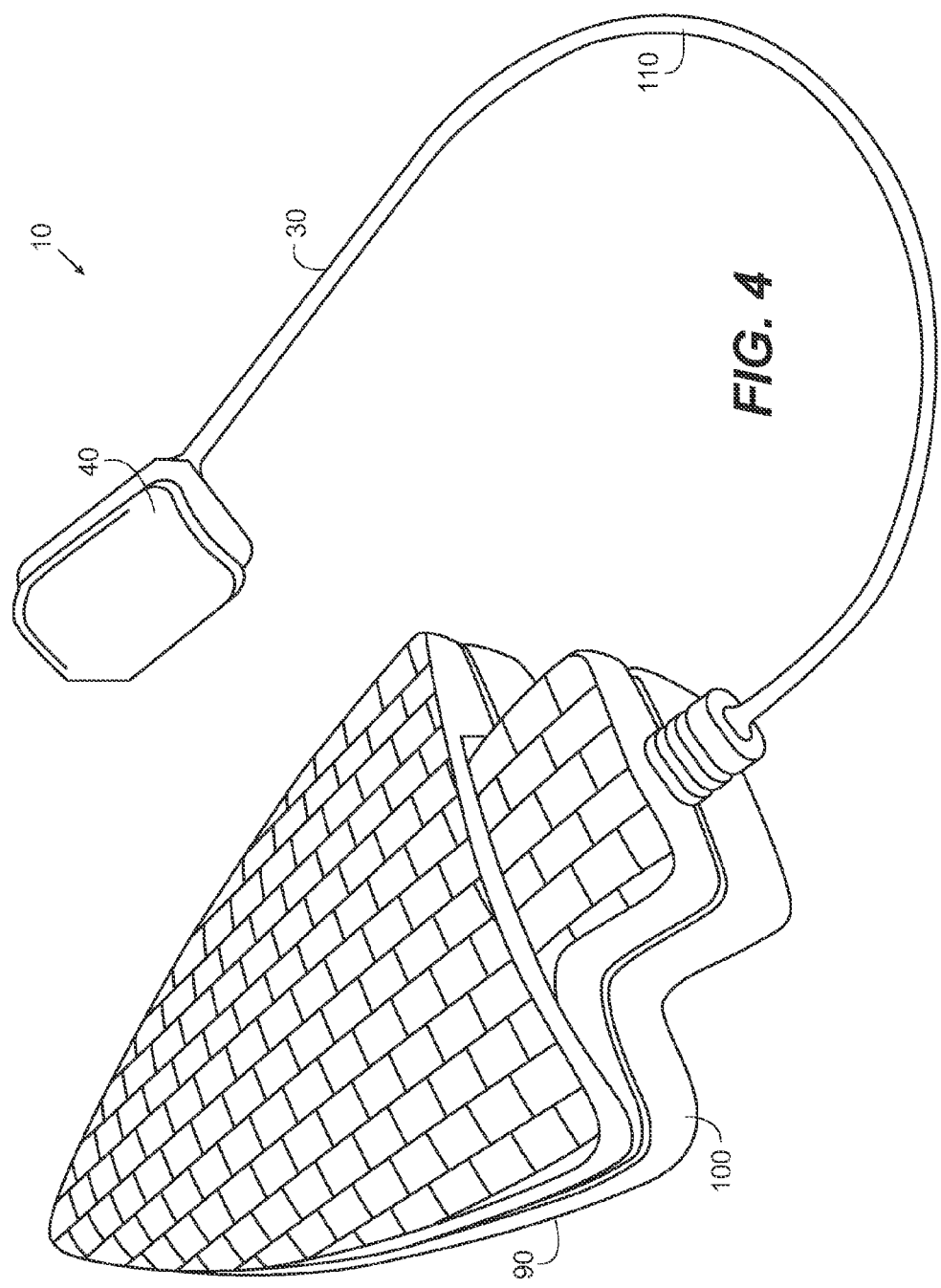
FIG. 4 is a general illustration of the preferred embodiment of the invention not installed on a bicycle.
Figure 5:
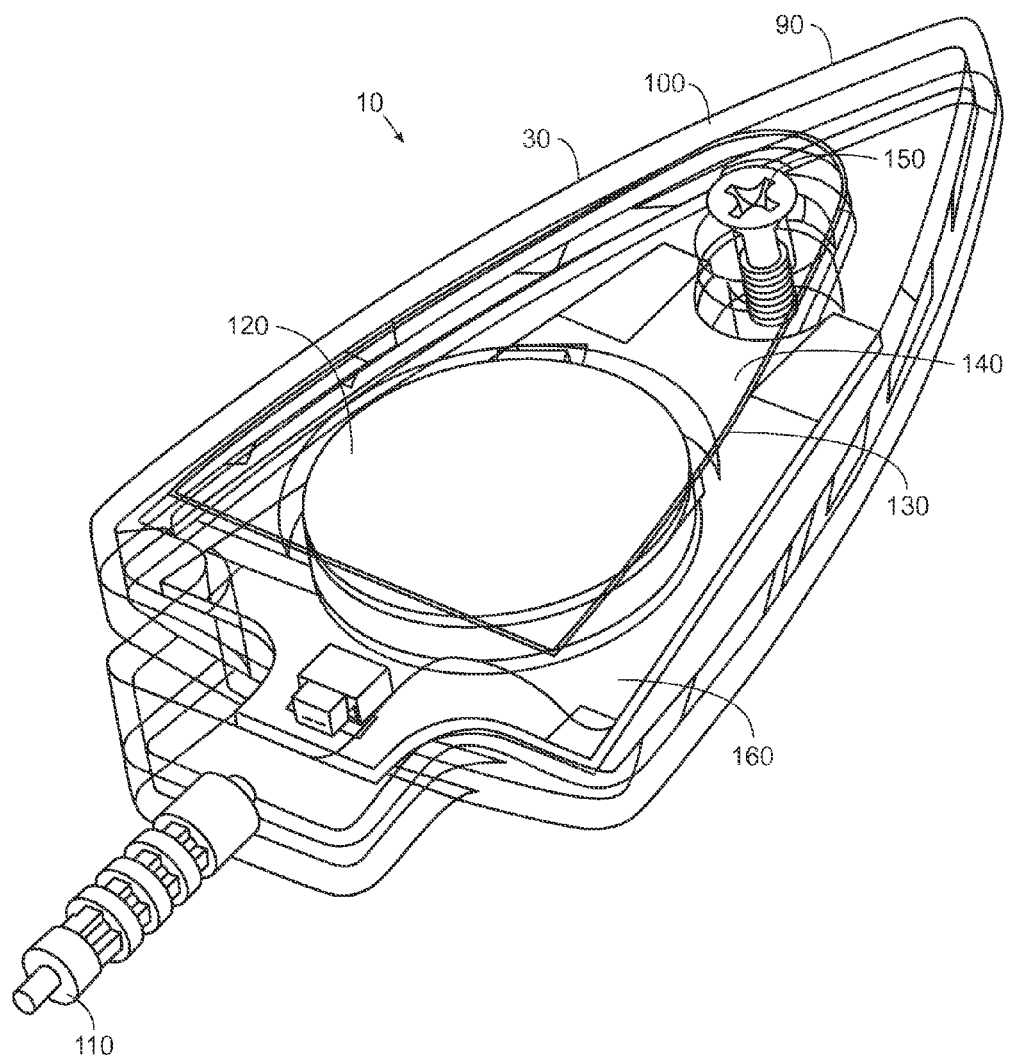
FIG. 5 is a general illustration of the preferred embodiment of the invention showing a see through depiction of a housing for a sensing system sensing unit.

Again referring to the illustrations in general and more specifically FIGS. 4 and 5, the sensing unit 90 of one aspect is a stand-alone unit, and thus includes a housing 100. It is contemplated to provide housing 100 that is rugged to survive rigorous sporting activity. Preferably, the housing 100 provides a universal interface 105, which permits mounting of the unit 90 to a variety of platforms and locations on bicycle 20 and or rider 15. The universal interface 105 is preferably a conformal surface, which conveniently permits mounting of the sensing unit 90 to a plurality of surfaces, e.g., a flat surface, around a bar, and so forth. Invention 10 contemplates taping, screwing, banding, tying, and so forth to the desired location on bike 20 and or user 15. Invention 10 contemplates utilizing VELCRO and or other fixation.

Alternatively, the sensing unit 90 can be integrated into objects already associated with bicycle 20 components. In one aspect, the sensing unit 90 is integrated into the bars, seat and so forth. In another aspect, the sensing unit 90 is removably integrated. In still another aspect, the sensing unit 90 is generally removably attached to rider 15, keeps wireless contact between sensor(s) 40 and other recording tools such as PDA, smart phones 170 and so forth.

Sensor system 30 may be powered by power sources 120 such as but not limited to replaceable battery. A preferred construction may utilize a CR2032 type battery. Invention 10 may also utilize rechargeable power source 120, solar powered and so forth.

Housing 100 may further include a removable door and or panel 130 for accessing the interior 140 of housing 100 for replacing power source 120 and so forth. Panel 130 may be screwed in place to housing 100 with screw 150. It is understood that numerous types of configuration may be utilized and invention 10 is not to be limited to such.

Housing 100 interior may include a microprocessor 160, chip, mother board, circuit board and so forth that is powered by power sources 120. As known in the prior art, microprocessor 160 is capable of sending, transmitting and or receiving communications from smart phone 170 as known in the art.

It is also contemplated that sensing unit 90 may not be utilized and sensor(s) 40 communicate directly with PDA, smart phone 170 and so forth. It is understood that sensor(s) 40 may be hard wired 110 to sensing unit 90, wireless communication and combinations thereof. Sensor system 30, sensor 40, and sensing unit 90 may communicate via BLUETOOTH, ANT+ and so forth.

Visual and or Audible Indicator

Invention 10 may include a visual indicator (not shown) that depicts when rider 15 is in the correct and or desired position 25 and not. By example, a green light may show when correct and a red light when rider 15 comes out of the correct position 25. Visual indicator may be placed on bicycle 20 in a manner visible to rider 15, connected to sensors 40 and sensor system 30 and so forth.

It is understood that numerous real time feed backs may be utilized such as but not limited to something like a level bubble in a housing that identifies when rider 15 is at the incline they plan to ride in the aerodynamic position 25. By example, the indicator may show and or otherwise indicate when rider 15 is at 1% incline and or below.

It is also understood that indicator may be audible, for example, the position data can be transmitted directly to a radio receiver connected to headphones worn by the user 15 or to a small speaker worn in the user's 15 ear. In accordance with this aspect of the invention, the sensing unit 90 transmits performance data directly into the receiver so that the user 15 can listen—in real time—to the results of his sports performance. Specifically, the radio receiver includes a data conversion unit, which responds to the receipt of performance data from the sensing unit 90 and which converts the performance data into sound, via the headphones, so that the user 15 listens to the performance data. By example, a beeping noise may be generated when out of the desired position 25. This may be audible with and or without a headset.

Operating System

A data collection component may be used to collect data from a subject in aerodynamic position, non-aerodynamic position, and or riding in general. Data collection component may comprise, for example, systems such as those illustrated and/or described above, although other systems may also be utilized. Data collection component may provide body positioning data of a subject, body movement data of a subject, and physiological data of a subject performing the activity. Analysis component may compare the data from data collection component to data in database. Analysis component may provide a report identifying and/or classifying the level of performance of a subject for any given type of data such as body movement and/or physiological and or overall. Analysis component may also provide a training plan for a subject. Training plan may identify areas for subject to attempt to improve and may further provide a series of activities that may be performed by subject to attempt to improve subject's performance. Analysis component may comprise software operating on any type of computer having a processor and computer readable media to perform a comparison between the subject's data and the data stored in database component.

In one aspect, invention 10 may provide sensor system 30, which includes a controller subsystem connected with one or more sensor(s) 40. The controller subsystem may include a microprocessor 160 or microcontroller and can include preamplifiers and A/D converters to interface with the sensor(s) 40. It is also contemplated sensor 40 may contain such circuitry and or combinations thereof. The controller subsystem can further include logic circuitry and/or software modules to logic out unwanted data from sensor(s) 40 (e.g., down time that does not correspond to reasonable event). Preferably, the controller subsystem also includes digital memory to store parameters for sensor(s) 40 and to store data such as power, time in position, speed and so forth collectively referred to as performance data for later retrieval. A battery may be used to power the controller subsystem. The battery can also be used for sensor(s) 40, if required.

However, one preferred sensor 40, which can function, for any of the sensors is the piezoelectric foils such as made from AMP SENSORS™. These foils do not require power and rather generate a voltage in response to input forces. A display can be integrated with the sensing unit 90 to provide direct feedback to the performance data. In one aspect, a user interface is also integrated with the sensing unit 90 to provide user control of the sensing unit 90, e.g., to include an ON/OFF switch and buttons to select for acquisition or display of certain performance data.

In one preferred aspect, the sensing unit 90 provides for the measurement of power entirely within a watch. Manufacturers such as CASIO™, TIMEX™, SEIKO™, FILA™, and SWATCH™ make sport wristwatches with certain digital electronics disposed therein. In accordance with the invention, power measurement capability is added within such a watch so that data can be provided.

In one preferred aspect, the performance data is transmitted via radiofrequencies (or other data transfer technique, including infrared light or inductively coupled electronics) from the sensing unit 90 to a data unit (not shown), which is ergonomically compatible with the user 15. Accordingly, the sensing unit 90 in this aspect does not require a display as performance data is made available to the user 15 through the data unit. For example, the data unit of one aspect is a watch that the user 15 wears on user's wrist. The data unit can alternatively be made into a "pager-like" module such as known fully in the art (MOTOROLA™ is one well-known manufacturer that makes pager modules). In either case, the sensing unit 90 and the data unit cooperate to provide a complete system for the user 15.

In still another aspect, the data unit is not required. Rather, performance data is transmitted such as by RF directly from the sensing unit 90 to a base station (not shown) associated with the sporting area. For example, the base station can be a computer in a chase vehicle. The sensing unit 90 of this aspect transmits performance data tagged to particular user 15 to the base station where performance data from all users is collated, stored, compared and/or printed for various purposes. Preferably, the base station includes processing capability and storage whereby performance data can be assessed and processed. For example, user 15 at the end of the day can receive a printout (or computer disk) of user's performance data; and the report can include a comparison to other performers within the sporting activity. It is contemplated that reporting and data analysis may take place within a web portal similar to what is available through TrainingPeaks.com or Strava.com or GarminConnect.com. It is also contemplated invention 10 may be utilized by same.

If the event occurs in a mountainous region, for example, user 15 can see his performance data as compared to others on a particular mountain. Performance data can also be catalogued according to age, date, and performance data type (e.g., airtime, power, speed and/or drop distance). It is understood that invention 10 may have a larger value for aerodynamics on flatter courses in general and comparisons may be made accordingly with previous segments and segments in general should not be considered limited to mountain type segments.

In one aspect, the base station augments the sensing units 90 by providing processing power to calculate and quantify the performance data. For example, in this aspect, raw sensor data such as from a microphone is transmitted from the sensing unit 90 to the base station, which thereafter calculates the appropriate performance data. The sensing unit 90 "tags" the transmitted data so as to identify particular user 15. The base station of this aspect then calculates and stores the appropriate performance data for that particular user 15.

The base station can further include a Web Site server that connects the base station to, other such base stations via the Internet so that performance data from users can be collated, stored, compared and/or printed for a variety of purposes. One or more servers thus function as the primary servers from which users can obtain their performance data from their own computers, via the Internet (or via a LAN or WAN). In one aspect, the primary servers also function as a gaming network where performance data from all users is integrated in a recreational manner, and made available to all or selected users.

Mobile App and or Report Generator

It is understood also that a mobile app and or application may be utilized. That it may initially record simple in/out of aero position 25; provide immediate visual feedback on percent of time in aero position 25; eventually percent of time at specific inclines; allow an individual to select timeframe for feedback to eliminate a start/stop button; initial activation of sensor turns "on"; link to Google Map/MapMyRide/and other mapping options; provide and sound various alarm sounds based on user settings on when they want alert to get into/out of aero such as a user could set for <1%, 1%, 2%, 3% incline preference for alert; send data to website for additional review and personalization by user; and so forth as well as combination thereof.

Figure 6:
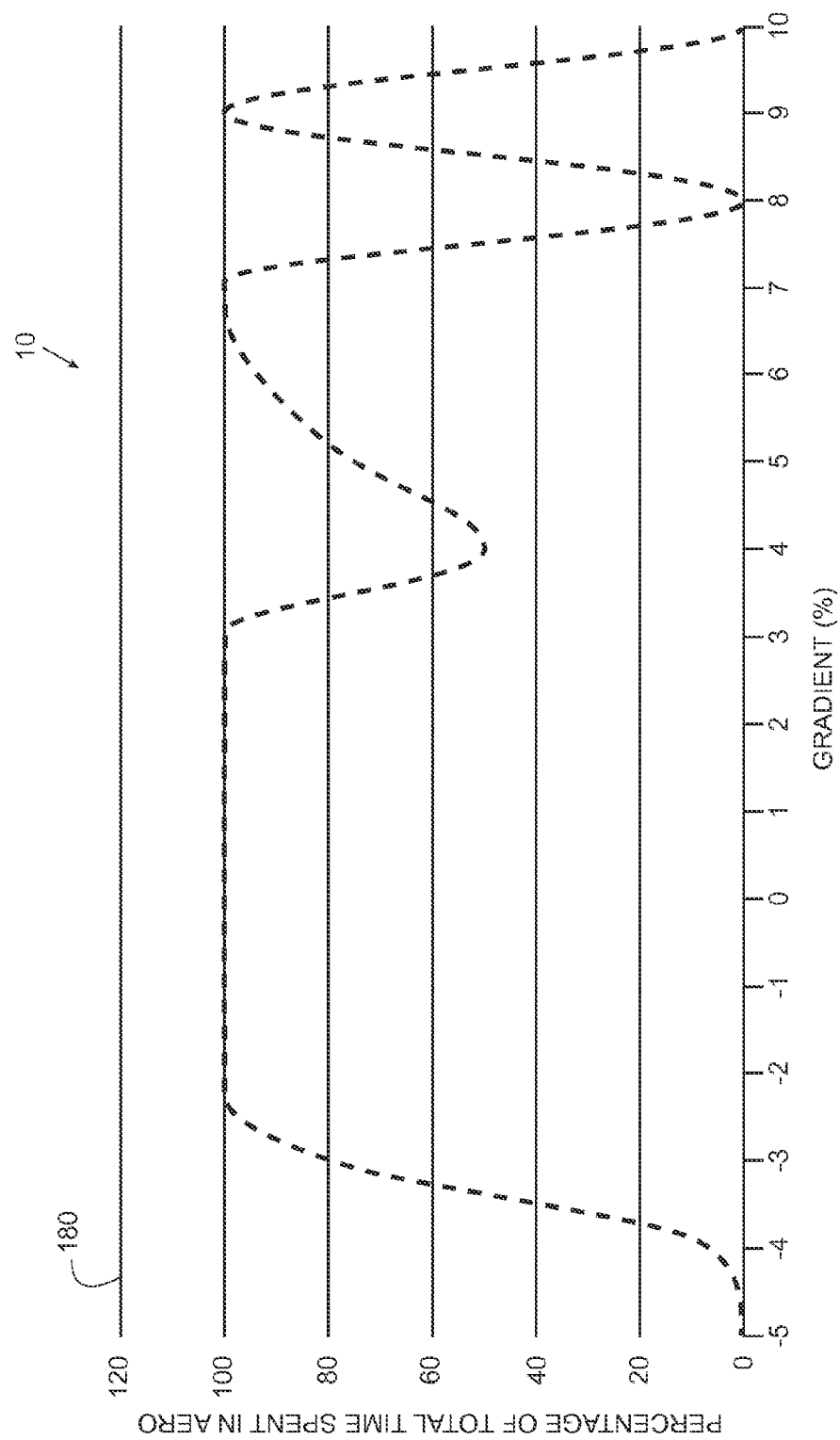
FIG. 6 is a general illustration of the preferred embodiment of the invention depicting a visual and graphic depiction of data associated with a user being in an aero and non-aero position as determined by the invention.
Figure 7:
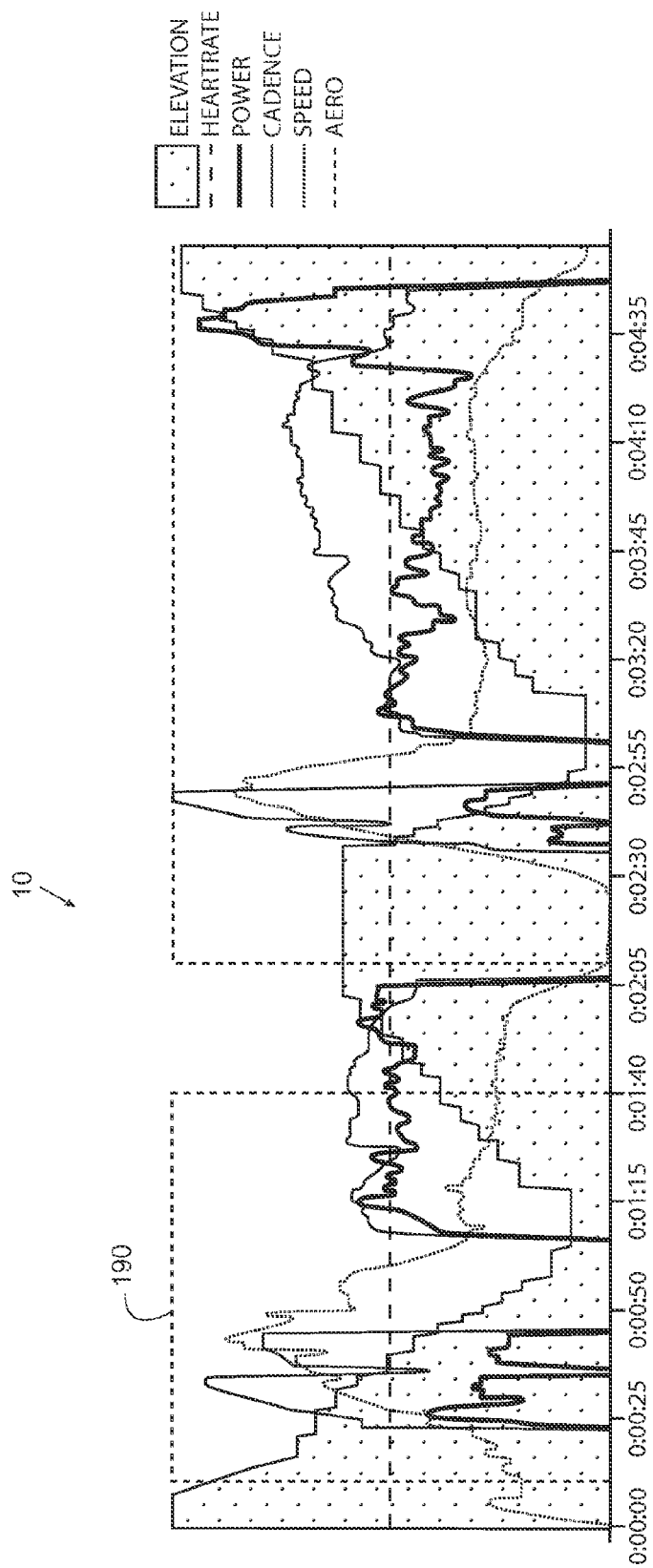
FIG. 7 is a general illustration of the preferred embodiment of the invention depicting a visual and graphic depiction of data associated with a user being in an aero and non-aero position as determined by the invention.

Once again referring to the illustrations in general and more in particular to FIGS. 6 and 7, invention 10 contemplates utilizing the time in and out of the aero dynamic position 25 to generate visual depicts of information 180 and 190, reports, graphs and so forth. This may be accomplished by utilizing known prior art bicycling applications that monitor heart rate, power, cadence, speed, elevations during a ride and comparing to the time in the aero and non-aero position over a period of time.

Invention 10 allows the tracking of aero and non-aero positioning to be cross referenced with other applications and data known in the art such as but not limited to:

AERO TENDENCIES

| | Average | Maximum |
|---|---|---|
| Speed (km/h) | 7.2 mph | 20 mph |
| Aero | 6.8 mph | 12.6 mph |
| No Aero | 7.8 mph | 20 mph |
| Power | 106 W | 239 W |
| Aero | 147 W | 239 W |
| No Aero | 33 W | 164 W |
| Heartrate | 86 BPM | 108 BPM |
| Aero | 88 BPM | 107 BPM |
| No Aero | 82 BPM | 108 BPM |
| Cadence | 38 RPM | 92 RPM |
| Aero | 46 RPM | 92 RPM |
| No Aero | 24 RPM | 92 RPM |

Website

Furthermore, it is understood that invention 10 may utilize a website. The site may utilize APIs to collect data from various ANT+ and other tools to collect HR, Power, Speed, Incline, and other feedback compared to aero position; connect to MapMyRide, GarminConnect, Polar and other tools similar to Strava to provide variety of data for comparison in/out of aero; have the ability to personalize settings to examine percent of time in aero position when at specific inclines with a mapping system; keep personal records section for each user that matches up time and/or percent of time in aero position for each segment they identify; provide a scoring system to compare progress over time, set goals on specific segments, total time/week or month in aero position and so forth; make data available to Training Peaks, MapMyRide, Strava and others for integration into their system; provide safety and disclaimer notifications about riding at safe speeds, cornering in aero position, rider responsibility and so forth.

Further Embodiments

Invention 10 still further contemplates as discussed above and further, embodiments that may include a plug-in phone application and or app; a free standing phone application and or app; a pressure transducer device and or system; a magnetic connection device and or system; a radio frequency identification (RFID) device and or system; combinations thereof and so forth.

Invention 10 may also include a pressure sensor device and or system of weight for use for weight distribution between legs and upper body; a finger switch device and or system; a capacitive touch sensor device and or system; a wearable device and or system that may detect angles, contact, and such with or without distance from the aero position; including any of the above in the specification to be built into aerobar or handlebars of the bicycle and or other equipment.

It is therefore contemplated that invention 10 may be an apparatus for recording a bicycle rider's time in an aerodynamic position comprising a sensor that produces a signal when said rider is in said aerodynamic position; a microprocessor in communication with said sensor for recording said signal from said sensor and transforming said signal into a wireless electronic output; a transmitter in communication with said microprocessor for transmitting said electronic output; and a power source in communication with said sensor, said microprocessor, and said transmitter. The sensor may be a dome cap sensor and placed on an aero bar on said bicycle and activated by the forearm of said rider being placed on said sensor. Invention 10 may include a power source utilizing a battery and have electronic output that is compatible to BLUE TOOTH communications.

Invention 10 may further include a system for analyzing a bicycle rider's time in an aerodynamic position comprising a sensor apparatus having a sensor that produces a signal when said rider is in said aerodynamic position; a microprocessor in communication with said sensor for recording said signal from said sensor and transforming said signal into a wireless electronic output; a transmitter in communication with said microprocessor for transmitting said electronic output; a power source in communication with said sensor, said microprocessor, and said transmitter; and a smartphone for receiving said wireless electronic output from said microprocessor.

Changes may be made in the combinations, operations, and arrangements of the various parts and elements described herein without departing from the spirit and scope of the invention. Other embodiments of the invention, including combinations, additions, variations and other modifications of the disclosed embodiments will be obvious to those skilled in the art and are within the scope of the claims.

I claim:

1. An apparatus for recording a bicycle rider's time in an aerodynamic position comprising:
    a sensor located on a an aero bar of a bicycle that produces a signal when said rider is in said aerodynamic position;
    a housing removably mountable to said bicycle wherein said housing has an accessible interior;

a microprocessor disposed in said housing in communication with said sensor for recording said signal from said sensor and transforming said signal into a wireless electronic output;

a transmitter disposed in said housing in communication with said microprocessor for transmitting said electronic output to a smartphone; and a battery disposed in said housing in communication with said sensor, said microprocessor, and said transmitter.

2. The apparatus of claim 1 wherein said sensor is a dome cap sensor.

3. The apparatus of claim 1 wherein said electronic output is compatible to BLUE TOOTH communications.

\* \* \* \* \*